United States Patent
Lim et al.

(10) Patent No.: US 9,462,171 B2
(45) Date of Patent: Oct. 4, 2016

(54) CAMERA ASSEMBLY FOR AN ELECTRONIC DEVICE HAVING A SEAL MEMBER INTEGRALLY FORMED THEREWITH

(71) Applicant: Google Technology Holdings LLC, Mountain View, CA (US)

(72) Inventors: David Kyungtag Lim, Glenview, IL (US); William R. Groves, Naperville, IL (US); Roger W. Harmon, Crystal Lake, IL (US); Jason P. Wojack, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/447,942

(22) Filed: Jul. 31, 2014

(65) Prior Publication Data

US 2016/0037036 A1 Feb. 4, 2016

(51) Int. Cl.
*H04N 5/225* (2006.01)

(52) U.S. Cl.
CPC .......... *H04N 5/2257* (2013.01); *H04N 5/2252* (2013.01); *H04N 5/2253* (2013.01); *H04N 5/2254* (2013.01)

(58) Field of Classification Search
CPC .. H04N 5/225; H04N 5/2257; H04N 5/2252; H04N 5/2253; H04N 5/2254
See application file for complete search history.

(56) References Cited

U.S. PATENT DOCUMENTS

| | | | |
|---|---|---|---|
| 7,312,984 B2 | 12/2007 | Richardson et al. | |
| 2003/0193605 A1* | 10/2003 | Yamaguchi | G02B 9/14 348/335 |
| 2007/0132610 A1 | 6/2007 | Guernalec et al. | |
| 2008/0095528 A1* | 4/2008 | Jao | G03B 9/02 396/458 |
| 2012/0133825 A1* | 5/2012 | Nakajima | H04N 5/2253 348/374 |
| 2013/0002938 A1* | 1/2013 | Kim | G02B 9/04 348/360 |
| 2013/0223828 A1 | 8/2013 | Enomoto | |
| 2014/0140533 A1 | 5/2014 | Malek et al. | |

* cited by examiner

*Primary Examiner* — Tuan Ho
(74) *Attorney, Agent, or Firm* — Faegre Baker Daniels LLP

(57) ABSTRACT

A camera assembly for an electronic device. The camera assembly comprises an image sensor, a housing barrel, at least one lens and a seal member. The housing barrel is positioned above the image sensor and includes a proximal end and a distal end, as well as an inner surface which defines a barrel cavity. The image sensor is configured to receive light that extends through the barrel cavity. The at least one lens is positioned within the housing barrel. The upper lens cover is positioned over the distal end of the housing barrel. The upper lens cover has an inner surface and an outer surface. The seal member is integrally formed with one of the housing barrel, at a distal end thereof, and the inner surface of the upper lens cover, wherein the seal member effectively provides a seal between the housing barrel and the upper lens cover.

16 Claims, 4 Drawing Sheets

CAMERA ASSEMBLY FOR AN ELECTRONIC DEVICE HAVING A SEAL MEMBER INTEGRALLY FORMED THEREWITH

CROSS-REFERENCE TO RELATED APPLICATION

N/A

BACKGROUND OF THE DISCLOSURE

1. Field of the Disclosure

The invention relates in general to camera lens protection, and more particularly, to a camera assembly for an electronic device having a seal member integrally formed therewith.

2. Background Art

The use of cameras for still pictures and motion pictures on electronic devices is known in the art. Such electronic devices may include a mobile phone, a tablet, a personal digital assistant, a music player, a laptop, a camera, a rear facing automobile camera or a security camera, among others. With advances in technology, the cameras and lenses are becoming smaller. At the same time, the resolution (i.e., pixels) of such cameras is increasing and becoming more dense. Furthermore, waterproofing and resistance to damage from water, debris, and dust is of increasing need, as such electronic devices are exposed to the elements to an ever greater extent. Finally, there is a desire to increase the field of view of the camera to provide for a larger image area.

Unfortunately, the desire for the increased field of view tends to be in conflict with the reduction in size of the camera and the increased requirements for durability from a standpoint of sealing the camera.

Currently, camera seal members are separate compressive pads and/or elastomeric grommets that are placed on the camera and essentially squeezed between components. Unfortunately, space is needed beyond the camera barrel to accommodate such items. Additionally, the size of the pad or grommet seal member is increased due to assembly and manufacturing tolerances for the part and the assembly process.

Such increased size of the seal member adversely affects the field of view as, typically, the seal member extends into the camera body to some extent. In addition, such separate seal members have a tendency to migrate, creep or move in response to a shear load, such that they may further restrict the field of view.

SUMMARY OF THE DISCLOSURE

The disclosure is directed to a camera assembly for an electronic device. The camera assembly comprises an image sensor, a housing barrel, at least one lens and a seal member. The housing barrel is positioned above the image sensor and includes a proximal end and a distal end, as well as an inner surface which defines a barrel cavity. The image sensor is configured to receive light that extends through the barrel cavity. The at least one lens is positioned within the housing barrel. The upper lens cover is positioned over the distal end of the housing barrel. The upper lens cover has an inner surface and an outer surface. The seal member is integrally formed with one of the housing barrel, at a distal end thereof, and the inner surface of the upper lens cover, wherein the seal member effectively provides a seal between the housing barrel and the upper lens cover.

In some configurations, the seal member is over-molded onto the distal end of the housing barrel.

In some configurations, the distal end of the housing barrel defines an upper end surface. The seal member has a coupling surface which is over-molded to the upper end surface. In some such configurations, the coupling surface is over-molded solely to the upper end surface.

In some configurations, the housing barrel and the over-molded seal member includes a coupling surface coupled to the housing barrel. A seat surface is opposite the coupling surface, with an inner surface therebetween. In some such configurations, the inner surface is angled such that the coupling surface has a width that is greater than a width of the seat surface.

In some configurations, a protective cover is positioned over the image sensor, and between the image sensor and the housing barrel.

In some such configurations, an outer housing extends about an outer surface of the housing barrel and extending about the image sensor.

In some configurations the seal member comprises one of the group selected from a thermoplastic elastomer, a thermoplastic urethane, a rubber and a silicone.

In some configurations, the housing barrel comprises a glass reinforced liquid crystal polymer.

In some configurations, the seal member is one of over-molded and through liquid dispensing application onto the inner surface of the upper lens cover.

In some configurations, the seal member includes a coupling surface that is integrally coupled to the inner surface of the upper lens cover.

In some configurations, the seal member includes a seat surface opposing the coupling surface.

In some configurations, the housing barrel has an upper end surface at the distal end thereof. The seat surface interfaces with the upper end surface. A width of the seat surface is substantially equal to or less than a width of the upper end surface.

In some configurations, the camera assembly includes a lower lens cover positioned between the image sensor and the housing barrel.

In another aspect of the disclosure, the disclosure is directed to an electronic device having a camera assembly as described above, namely a camera assembly having an image sensor, a housing barrel, at least one lens within the barrel, an upper lens cover and a seal member that is positioned between the housing barrel and the upper lens that is integrally formed with the former or the latter. The camera assembly is positioned within the electronic device, with the camera assembly opening toward an outer surface of the electronic device.

In some configurations, the seal member is over-molded to the distal end of the housing barrel.

In some configurations, the seal member is one of over-molded and through liquid dispensing application integrally formed with the inner surface of the upper lens cover.

In another aspect of the disclosure, the disclosure is directed to a housing barrel and seal member for an electronic device. The housing barrel includes a proximal end and a distal end. Further, the housing barrel includes an inner surface that defines a barrel cavity configured to receive at least one lens therein. The seal member is over-molded to the distal end of the housing barrel and includes a coupling surface at the distal end and a seat surface opposite of the coupling surface.

In some configurations, the housing barrel includes an upper end surface at the distal end. The coupling surface has a width that is smaller than or equal to a width of the upper end surface.

BRIEF DESCRIPTION OF THE DRAWINGS

The disclosure will now be described with reference to the drawings wherein.

DETAILED DESCRIPTION OF THE DISCLOSURE

Figure 1:
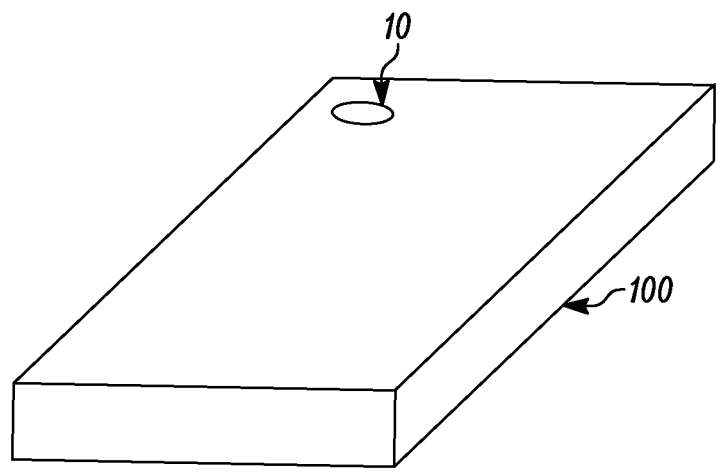
FIG. 1 of the drawings is a perspective view of the electronic device having the camera assembly of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the camera assembly is shown generally at 10. The camera assembly 10 is well suited for use in association with an electronic device 100. The electronic device 100 may be a mobile phone, a tablet, a personal digital assistant, a music player, laptop, camera, automobile backup camera, security camera among others which is configured with a camera for the taking of still pictures or motion pictures. Indeed, the electronic device is not limited to any particular type of electronic device. It will be understood that with such mobile devices, with ever decreasing size coupled with increased performance, certain manufacturing limitations are being magnified. Among these issues is the sealing system of the camera assembly.

Figure 2:
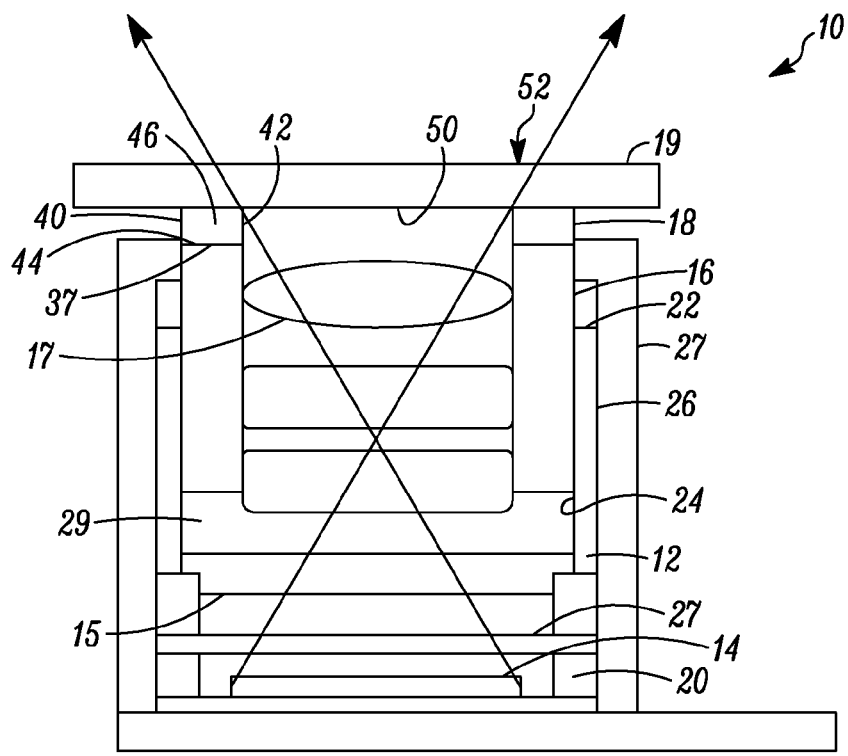
FIG. 2 of the drawings is a schematic cross-sectional view of the camera assembly of the present disclosure, showing a configuration having a metal member, with the integrally formed seal member being formed with the housing barrel through an over-molding or a liquid dispensing application.

The camera assembly 10 is shown in FIG. 2 as comprising outer housing 12, image sensor 14, lower lens covers 15, housing barrel 16, internal camera lenses 17, seal member 18 and upper lens cover 19. It will be understood that the camera assembly 10 is positioned within the electronic device 100 and typically the cameras are configured to have an aperture on either one of the back surface and the front surface of the electronic device (although not being limited thereto).

The outer housing 12 includes first end 20, second end 22, inner surface 24 and outer surface 26. Generally, the inner surface 24 defines a generally circular cross-sectional configuration. Depending on the configuration, the outer housing 12 may comprise a single component or may comprise multiple components that are generally stacked onto each other between the first end and the second end thereof. Indeed, the outer housing may comprise multiple components which help to locate various components of the camera and the relative positions of a number of the components. The outer housing 12 defines an inner cavity 29 within the inner surface 24 thereof.

A metal member 27, often referred to as a can, may extend about the outer housing. Such a metal member is utilized to shield electromagnetic interference and is typically made from a stainless steel, although other materials are contemplated. In the configuration shown, the metal member is shown as extending the length of the outer housing and includes an inwardly directed flange that extends over the second end 22 of the outer housing 12.

The image sensor 14 is positioned at or near the first end 20 of the outer housing and generally within the cavity defined by the outer housing. The image sensor may comprise any one of a number of different image sensors having particular desired features, including, but not limited to the pixel resolution, wavelength capture ranges, among other specifications. A protective cover 27 may extend over the image sensor and be coupled to the outer housing 12. In some embodiments, the outer housing may include slots which are configured to receive the protective cover 27 so as to fix its location relative to the outer housing and the image sensor. The image sensor is configured to receive light that extends through the barrel cavity, as will be described below.

Generally, a lower lens cover 15 is employed between the image sensor 14 (or the protective cover 27) and the housing barrel 16 (and/or the internal camera lenses 17). The lower lens may be registered to a slot extending within the outer housing. In the embodiment shown, the lower lens cover 15 is positioned at the interface between two components of the outer housing. In other embodiments, the lower lens cover may be coupled to a separate component that likewise provides protection for the internal camera lenses 17.

Figure 3:
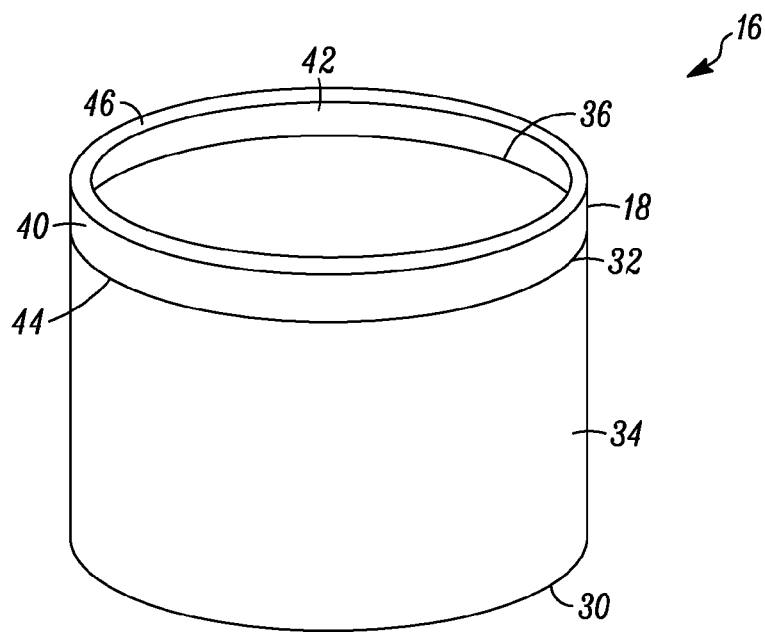
FIG. 3 of the drawings is a perspective view of the housing barrel and integrally formed seal member, which is formed through an over-molding or a liquid dispensing application.

The housing barrel 16 comprises a member of a generally cylindrical configuration having proximal end 30 and distal end 32. With added reference to FIG. 3, the housing barrel 16 includes outer surface 34 and inner surface 36. The inner surface 36 defines a barrel cavity 39. Typically, the barrel is formed from a liquid crystal polymer (LCP) reinforced with glass, although the barrel is not limited to such a material. It will be understood that it is desirable to have a barrel that is stiff so as to reduce distortions. The housing barrel, at the distal end 32 thereof includes an upper end surface 37 which is configured to receive the seal member. A number of different configurations for such a surface are contemplated, including but not limited to a planar surface, a outwardly convex surface, an outwardly concave surface and the like. It will be understood that such a surface can be varied to achieve the desired cooperation with the over-molded seal member (which will be described below).

It will be understood that while the housing barrel is shown as having a cavity that is substantially circular in cross-section, other configurations are likewise contemplated. For example, the housing barrel may have a frusto-conical configuration with a diameter that is increasing toward the distal end or decreasing toward the distal end. In other configurations, the cross-sectional configuration of the housing barrel may be other than circular, that is, elliptical, square, or polygonal, among others.

Referring again to FIG. 2, internal camera lenses 17 are disposed within the housing barrel 16 and generally positioned so as to be parallel to each other and parallel to the image sensor. The particular combination of different internal camera lenses 17 and the relative position of each is well known to those of skill in the field of optics and camera lenses. That is, the disclosure is not limited to any particular number of positions of the different internal camera lenses. It will be understood that the internal camera lenses are maintained between the proximal end 30 and the distal end 32 of the housing barrel.

The upper lens cover 19 is shown as extending over the distal end 32 of the housing barrel 16 and includes inner surface 50 and outer surface 52. A number of different, and preferably transparent, materials are contemplated for the upper lens cover. Additional protection (i.e., waterproofing, resistive covers and the like) may be positioned to overlie the outer surface 52 of the upper lens cover 19.

The seal member 18 is shown as comprising a member that is, in the configuration of FIG. 2, over-molded onto the distal end 32 of the housing barrel. With additional reference to FIG. 3, the seal member 18 includes outer surface 40, inner surface 42, coupling surface 44 and seat surface 46. More particularly, it is desired that the coupling surface 44 mates with the upper end surface 37 of the housing barrel 16. In certain configurations, it is desired that the coupling surface extends over the entirety of the upper end surface 37 of the housing barrel 16. In other configurations, the coupling surface 44 of the seal member 18 has a width that is equal to or less than the upper end surface 37, and a portion of the upper end surface 37 may therefore remain free of coupling with the seal member. It will be understood that in other configurations, the coupling surface may extend beyond the upper end surface 37, either beyond the inner surface 36 or the outer surface 34 of the housing barrel. The upper end surface 37 may include surface variations (i.e., a surface pattern or a roughness) that provides enhanced adhesion between the housing barrel and the seal member.

Figure 6:
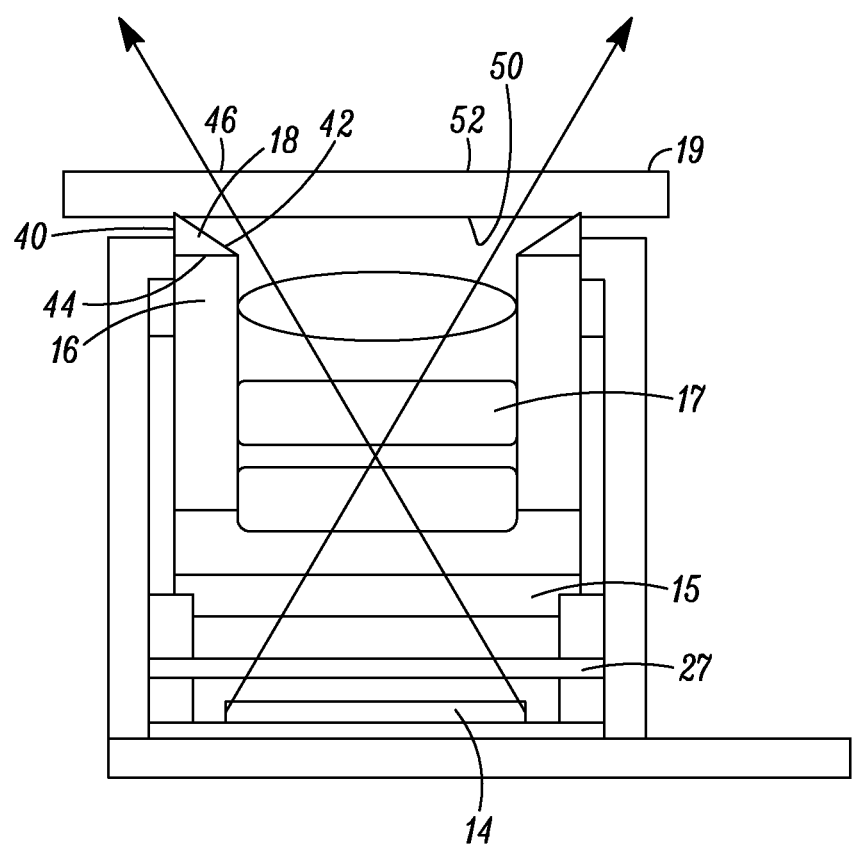
FIG. 6 of the drawings is a schematic cross-sectional view of the camera assembly of the present disclosure, showing a configuration the seal member tapering as it extends away from the housing barrel, to, in turn, increase the field of view.

In the configuration shown, by being over-molded onto the distal end of the housing barrel, the seal can be made smaller than conventionally applied adhesively to either one of the upper lens cover and/or the image sensor. Moreover, the dimensions and the position of the seal member can be tightly controlled relative to the barrel. Additionally, the intrusion beyond the inner surface of the housing barrel 16 can be minimized resulting in an improved field of view. Additionally, in the configuration shown in FIG. 6, the inner surface 42 can be inclined outwardly toward the outer surface such that the thickness of the seal member is minimized at the seat surface and thicker at the coupling surface. Such a configuration further maximizes the field of view without disrupting the integrity of the seal. The elastomer may comprise a thermoplastic elastomer (TPE), a thermoplastic urethane (TPU), a silicone based material, among other elastomeric materials which may be over-molded onto the distal end 32 of the housing barrel.

Figure 4:
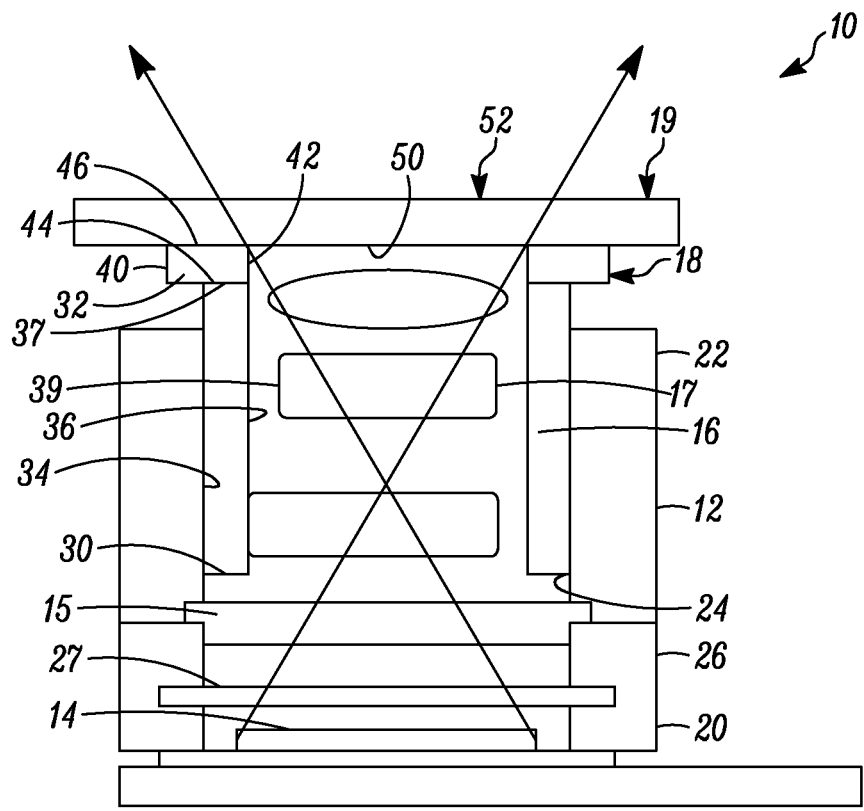
FIG. 4 of the drawings is a schematic cross-sectional view of the camera assembly of the present disclosure, showing a configuration without the metal member, and with the seal member being integrally formed on the upper lens cover through an over-molding or a liquid dispensing application.
Figure 5:
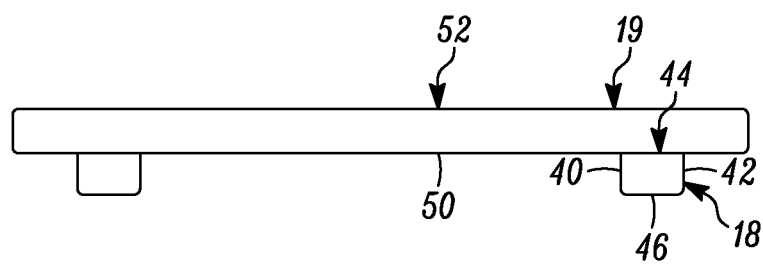
FIG. 5 of the drawings is a cross-sectional view of the upper lens cover and seal member formed therewith through an over-molding or a liquid dispensing application.

In another embodiment, and with reference to FIGS. 4 and 5, instead of being over-molded onto the distal end of the housing barrel, the seal member 18 can be over-molded, or liquid dispensing application (LDA) of the seal onto the inner surface 50 of the upper lens cover 19. In such an embodiment, again, through very tight tolerances, the seal member can be made more precisely, and may have a smaller footprint. Such a configuration again allows for the minimum interference to the field of view by the seal member.

Advantageously, the over-molded (or LDA applied) seal member eliminates the assembly of a separate part (namely an adhesively applied seal). In addition, the x/y footprint of the part for the need of manufacturing tolerances and assembly tolerances can be reduced. Furthermore, a tighter gap on the seal to the field of view, or to artwork or graphics applied to the electronic device as the assembly tolerances needed can be eliminated. Still further, such an over-molding eliminates the traditional creep or shear force movement of the prior art seal relative to each one of the housing barrel or the upper lens cover.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A camera assembly for an electronic device comprising:
    an image sensor;
    a housing barrel positioned above the image sensor and having a proximal end and a distal end, and an inner surface defining a barrel cavity, with the image sensor configured to receive light that extends through the barrel cavity;
    at least one lens positioned within the housing barrel;
    an upper lens cover positioned over the distal end of the housing barrel, the upper lens cover having an inner surface and an outer surface;
    a seal member integrally formed through at least one of over-molding and liquid dispensing application with one of the housing barrel, at the distal end thereof, and the inner surface of the upper lens cover, wherein the seal member effectively provides a seal between the housing barrel and the upper lens cover.

2. The camera assembly of claim 1 wherein the distal end of the housing barrel defines an upper end surface, the seal member having a coupling surface which is over-molded to the upper end surface.

3. The camera assembly of claim 2 wherein the coupling surface is over-molded solely to the upper end surface.

4. The camera assembly of claim 2 wherein the housing barrel and the over-molded seal member includes a coupling surface coupled to the housing barrel, and a seat surface opposite the coupling surface, with an inner surface therebetween.

5. The camera assembly of claim 4 wherein the inner surface is angled such that the coupling surface has a width that is greater than a width of the seat surface.

6. The camera assembly of claim 2 further comprising a protective cover positioned over the image sensor, and between the image sensor and the housing barrel.

7. The camera assembly of claim 6 further comprising an outer housing extending about an outer surface of the housing barrel and extending about the image sensor.

8. The camera assembly of claim 2 wherein the seal member comprises one of the group selected from a thermoplastic elastomer, a thermoplastic urethane, a rubber and a silicone.

9. The camera assembly of claim 2 wherein the housing barrel comprises a glass reinforced liquid crystal polymer.

10. The camera assembly of claim 1 wherein the seal member includes a coupling surface integrally coupled to the inner surface of the upper lens cover.

11. The camera assembly of claim 10 wherein the seal member includes a seat surface opposing the coupling surface.

12. The camera assembly of claim 10 wherein the housing barrel has an upper end surface at the distal end thereof, the seat surface interfacing with the upper end surface, with a width of the seat surface being substantially equal to or less than a width of the upper end surface.

13. The camera assembly of claim 1 wherein the camera assembly includes a lower lens cover positioned between the image sensor and the housing barrel.

14. An electronic device having a camera assembly comprising:
    an image sensor;
    a housing barrel positioned above the image sensor and having a proximal end and a distal end, and an inner surface defining a barrel cavity, with the image sensor configured to receive light that extends through the barrel cavity;
    at least one lens positioned within the housing barrel;
    an upper lens cover positioned over the distal end of the housing barrel, the upper lens cover having an inner surface and an outer surface;
    a seal member integrally formed through at least one of over-molding and liquid dispensing application with one of the housing barrel, at the distal end thereof, and the inner surface of the upper lens cover, wherein the seal member effectively provides a seal between the housing barrel and the upper lens cover,
    wherein the camera assembly is positioned within the electronic device and with the camera assembly opening toward an outer surface of the electronic device.

15. A housing barrel and seal member for an electronic device wherein:
    the housing barrel includes a proximal end and a distal end, and having an inner surface that defines a barrel cavity configured to receive at least one lens therein;
    the seal member is integrally formed through over molding to the distal end of the housing barrel and includes a coupling surface at the distal end and a seat surface opposite of the coupling surface.

16. The housing barrel and seal member of claim 15 wherein the housing barrel includes an upper end surface at the distal end, and wherein the coupling surface has a width that is smaller than or equal to a width of the upper end surface.

* * * * *